United States Patent
Moon

(10) Patent No.: US 8,432,763 B2
(45) Date of Patent: Apr. 30, 2013

(54) INTEGRATED CIRCUIT

(75) Inventor: Jinyeong Moon, Gyeonggi-do (KR)

(73) Assignee: Hynix Semiconductor Inc., Gyeonggi-do (KR)

( * ) Notice: Subject to any disclaimer, the term of this patent is extended or adjusted under 35 U.S.C. 154(b) by 164 days.

(21) Appl. No.: 13/104,417

(22) Filed: May 10, 2011

(65) Prior Publication Data

US 2012/0218840 A1 Aug. 30, 2012

(30) Foreign Application Priority Data

Feb. 28, 2011 (KR) ........................ 10-2011-0017901

(51) Int. Cl.
*G11C 7/10* (2006.01)

(52) U.S. Cl.
USPC ........................................ 365/225.7; 365/239

(58) Field of Classification Search ............ 365/189.17, 365/239
See application file for complete search history.

(56) References Cited

U.S. PATENT DOCUMENTS 5,404,338 A * 4/1995 Murai et al. ............. 365/189.05

2009/0207642 A1 * 8/2009 Shimano et al. ............... 365/72
2012/0113731 A1 * 5/2012 Shimano et al. ......... 365/189.15

FOREIGN PATENT DOCUMENTS

KR 1020090070545 7/2009
KR 1020100132140 12/2010

OTHER PUBLICATIONS

Notice of Allowance issued by the Korean Intellectual Property Office on Aug. 29, 2012.

* cited by examiner

*Primary Examiner* — Tuan T. Nguyen
(74) *Attorney, Agent, or Firm* — IP & T Group LLP

(57) ABSTRACT

An integrated circuit includes a plurality of data lines on which data aligned by a plurality of pulse signals are loaded, a plurality of transfer lines, a data transfer unit configured to transfer the data of the plurality of data lines to the plurality of transfer lines in response to a correlation signal, a data output unit configured to output the data of the transfer line corresponding to a transmission signal activated among a plurality of transmission signals, a correlation signal generation unit configured to generate the correlation signal using a latency value and a logic value of one of the plurality of transmission signals when a command is inputted to the correlation signal generation unit, and a pulse signal generation unit configured to sequentially activate the plurality of pulse signals when the command is inputted.

23 Claims, 8 Drawing Sheets

INTEGRATED CIRCUIT

CROSS-REFERENCE TO RELATED APPLICATIONS

The present application claims priority of Korean Patent Application No. 10-2011-0017901, filed on Feb. 28, 2011, which is incorporated herein by reference in its entirety.

BACKGROUND

1. Field

Exemplary embodiments of the present invention relate to an integrated circuit.

2. Description of the Related Art

While the demand for high-speed integrated circuits is increasing, physical limits are being reached in increasing speeds of integration circuits. For example, in the case of a memory device, there is a physical limit as to a further decrease in access time for a core region (a memory cell array region). To overcome such physical limits, the memory device may increase the speed of an input/output operation by internally processing data in parallel and serially outputting data. Here, a memory device uses a parallel-to-serial converter to convert parallel-processed internal data into serial data and output the serial data to outside a chip. Here, a variety of integrated circuits other than the memory device may perform parallel-to-serial data conversion within the chip (system).

FIG. 1 is a timing diagram illustrating an operation of converting four parallel data into serial data.

A parallel-to-serial conversion is achieved by sequentially transferring data loaded on a plurality of transfer lines P0 to P3 to a single line S. As illustrated in FIG. 1, in a case in which data D0 to D3 are loaded on four transfer lines P0 to P3, the data of the four lines P0 to P3 may be transferred to the output line S one by one. Therefore, signals CK0 to CK3 determining the points of time to transfer the data D0 to D3 aligned on the transfer lines P0 to P3 to the output line S are generated and used in the parallel-to-serial conversion.

In operation, the data D0 of the line P0 is transferred to the line S at the point of time when the signal CK0 is activated, and the data D1 of the line P1 is transferred to the line S at the point of time when the signal CK1 is activated. Also, the data D2 of the line P2 is transferred to the line S at the point of time when the signal CK2 is activated, and the data D3 of the line P3 is transferred to the line S at the point of time when the signal CK3 is activated.

As described above, the parallel-to-serial conversion is achieved by sequentially transferring data loaded on the plurality of transfer lines to the output line. Therefore, the signals determining the points of time to transfer the data from the plurality of transfer lines to the output line (hereinafter, referred to as transmission signals) are used. In the case of $2^N$:1 parallel-to-serial conversion, in particular, 4:1 or 8:1 parallel-to-serial conversion, the signals determining the points of time to transfer data can be simply generated by using a clock to generate four transmission signals. For example, as shown in FIG. 1, transmission signals CK0, CK1, CK2 and CK3 may be generated by using a clock CLK.

In the case of the 4:1 or 8:1 parallel-to-serial conversion using the transmission signals CK0, CK1, CK2 and CK3 generated by using the clock CLK to generate four transmission signals, where the order of the transmission signals CK0, CK1, CK2 and CK3 match the order of output data. For example, the first (or fifth) data outputted in response to a command (hereinafter, referred to as start data) is always outputted at the point of time when transmission signal CK0 is activated. Therefore, the start data is outputted at the point of time when transmission signal CK0 is activated.

A DDR4 semiconductor memory device uses a burst length (BL) of 10 bits, where ten bits of data is serially outputted at a time and thus, 10:1 parallel-to-serial conversion is to be performed in a parallel-to-serial converter. Here, the clock is divided into $2^N$ transmission signals. Therefore, transmission signals CK0, CK1, CK2 and CK3 generated by using the clock CLK may be used in the 10:1 parallel-to-serial conversion.

FIG. 2 is a timing diagram illustrating an operation of converting ten bits of parallel data into serial data by using transmission signals CK0, CK1, CK2 and CK3 generated by using a clock CLK.

In a process of outputting data in response to the first command, start data D0 is aligned with transmission signal CK0 and is transferred to an output line S. In a process of outputting data in response to the second command, start data D0' is aligned with transmission signal CK2 and is transferred to the output line S.

That is, the transmission signal transferring the start data to the line S is periodically changed. Therefore, in a case in which ten bits of data are successively outputted in response to successively inputted commands, the transmission signal transferring the start data is to be changed successively. If the parallel-to-serial conversion circuit for such a scheme is implemented within the integrated circuit, the complexity thereof may increase. In addition, if the integrated circuit is to output eight bits of data by using the parallel-to-serial conversion circuit and perform additional functions in the parallel-to-serial conversion circuit, the complexity of the parallel-to-serial conversion circuit will exponentially increase. As a result, the occupied area and complexity of the integrated circuit will also exponentially increase.

SUMMARY

An exemplary embodiment of the present invention is directed to a parallel-to-serial conversion circuit which perform a parallel-to-serial conversion on the plurality of data by using a simple configuration to accommodate the case in which the number of the plurality of data outputted in response to the single command is $2^N$ and the case in which the number of the plurality of data outputted in response to the single command is not $2^N$.

In accordance with an exemplary embodiment of the present invention, an integrated circuit includes: a plurality of data lines on which data aligned by a plurality of pulse signals are loaded; a plurality of transfer lines; a data transfer unit configured to transfer the data of the plurality of data lines to the plurality of transfer lines in response to a correlation signal; a data output unit configured to output the data of the transfer line corresponding to a transmission signal activated among a plurality of transmission signals; a correlation signal generation unit configured to generate the correlation signal using a latency value and a logic value of one of the plurality of transmission signals when a command is inputted to the correlation signal generation unit; and a pulse signal generation unit configured to sequentially activate the plurality of pulse signals when the command is inputted.

In accordance with another exemplary embodiment of the present invention, an integrated circuit includes: a plurality of data lines; a plurality of transfer lines; a data transfer unit configured to transfer data of the plurality of data lines to the plurality of transfer lines in response to a correlation signal; a data output unit configured to output data of the transfer line corresponding to a transmission signal activated among a plurality of transmission signals; and a correlation signal generation unit configured to generate the correlation signal using a latency value and a logic value of one of the plurality of transmission signals when a command is inputted to the correlation signal generation unit.

DETAILED DESCRIPTION

Figure 1:
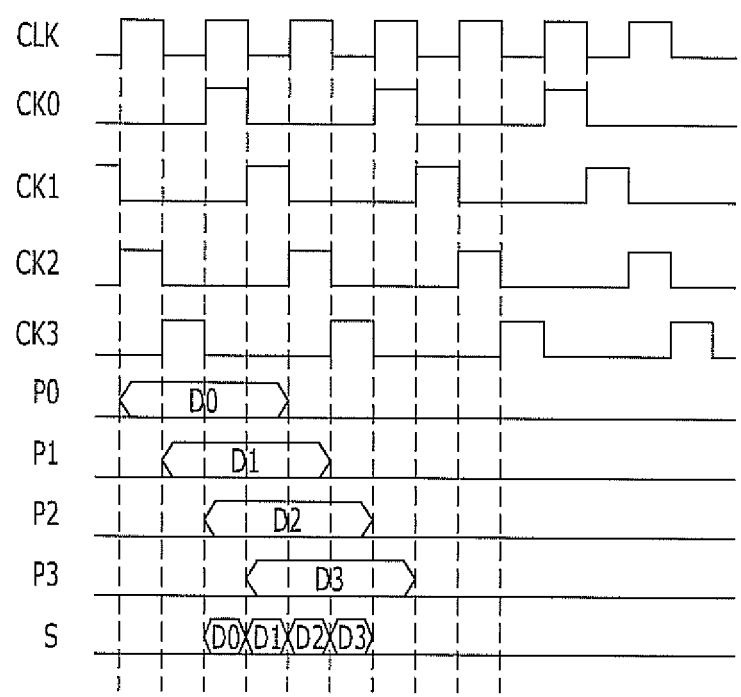
FIG. 1 is a timing diagram illustrating an operation of converting four parallel data into serial data.
Figure 2:
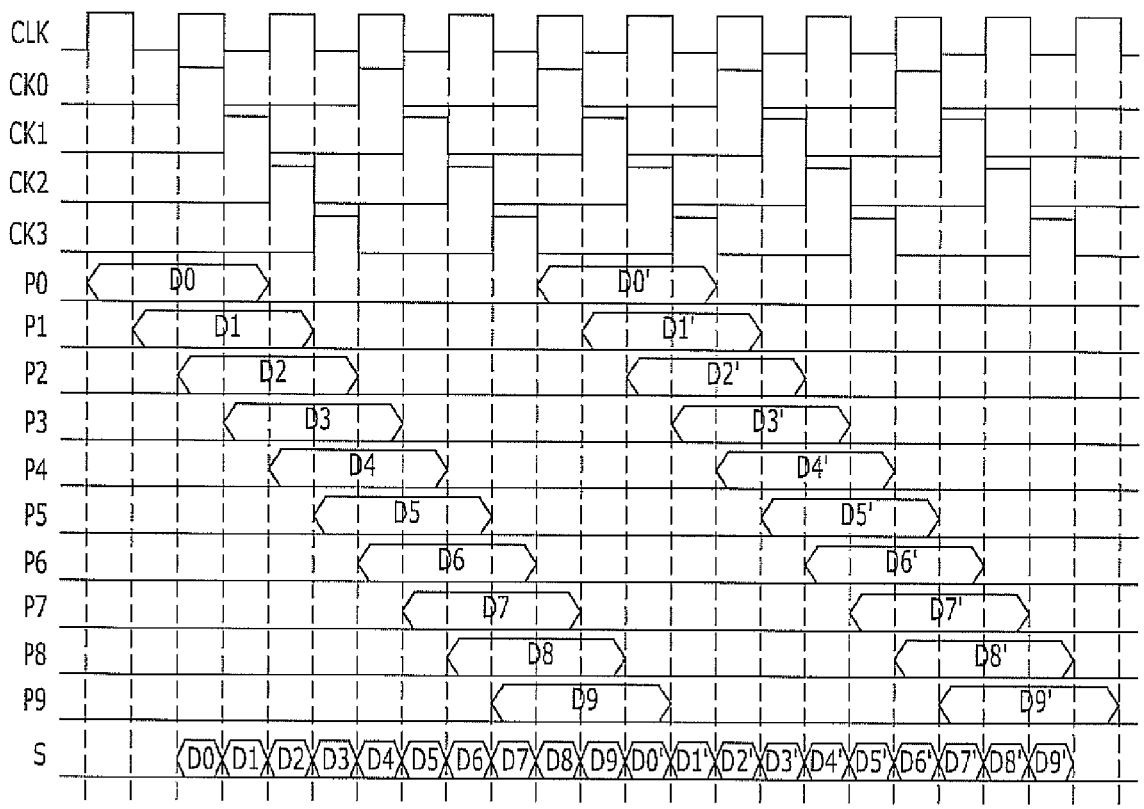
FIG. 2 is a timing diagram illustrating an operation of converting ten bits of parallel data into serial data by using transmission signals CK0, CK1, CK2 and CK3 generated by using a clock CLK.

Exemplary embodiments of the present invention will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Throughout the disclosure, like reference numerals refer to like parts throughout the various figures and embodiments of the present invention.

Figure 3:
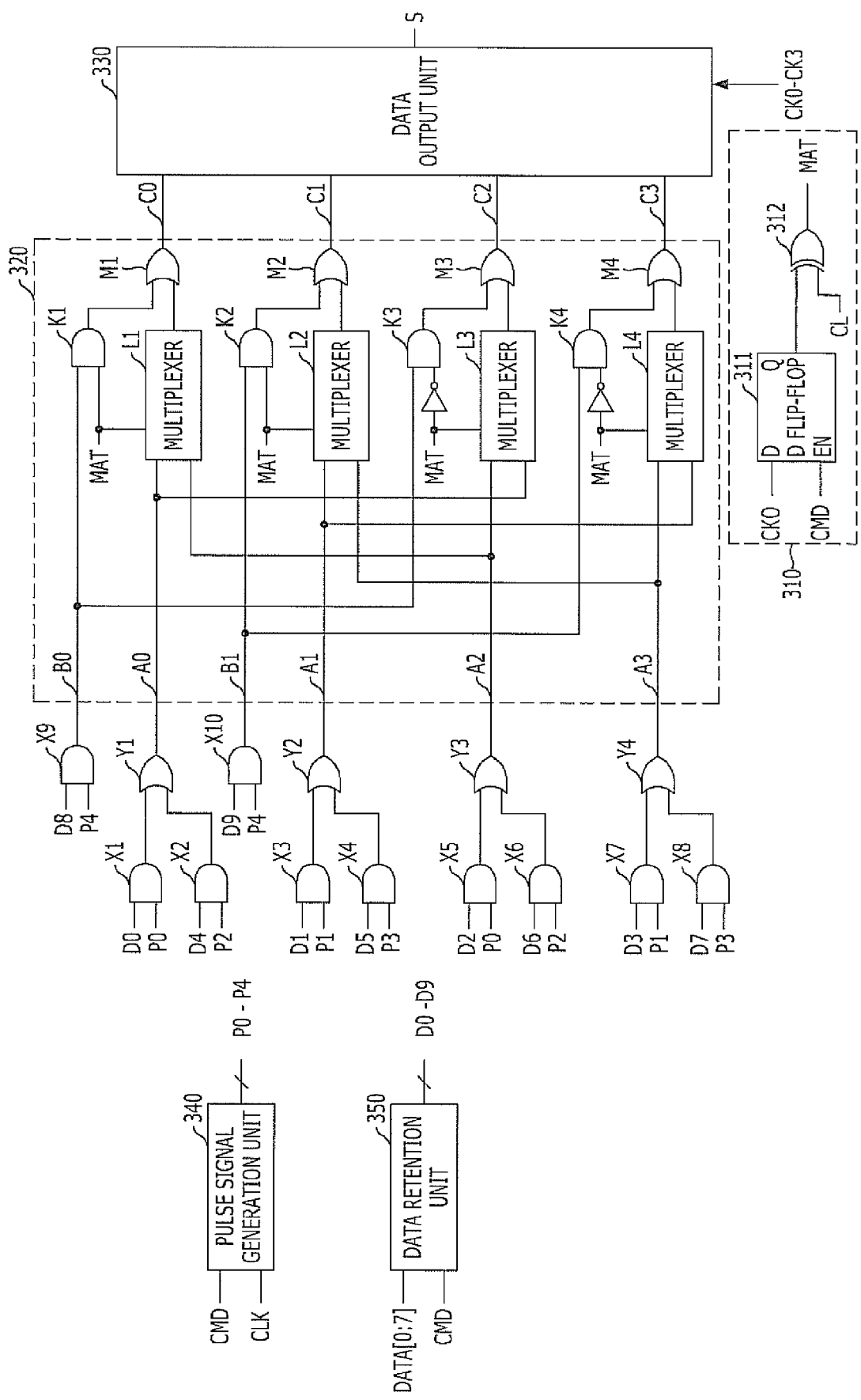
FIG. 3 is a configuration diagram of an integrated circuit in accordance with an exemplary embodiment of the present invention.

FIG. 3 is a configuration diagram of an integrated circuit in accordance with an exemplary embodiment of the present invention.

Referring to FIG. 3, the integrated circuit includes a plurality of data lines A0 to A3, B0 and B1, a plurality of transfer lines C0 to C3, a data transfer unit 320, a data output unit 330, a correlation signal generation unit 310, and a pulse signal generation unit 340. Data are loaded on the plurality of data lines A0 to A3, B0 and B1 in response to a plurality of pulse signals P0 to P4. The data transfer unit 320 transfers data of the data lines A0 to A3, B0 and B1 to the plurality of transfer lines C0 to C3 according to a correlation signal MAT. The data output unit 330 outputs data of the transfer line corresponding to a transmission signal activated among a plurality of transmission lines CK0 to CK3. The correlation signal generation unit 310 generates the correlation signal MAT by using a logic value of the transfer line CK0 among the plurality of transfer lines C0 to C3 and a latency value when a command CMD is inputted thereto. The pulse signal generation unit 340 sequentially activates a plurality of pulse signals P0 to P4 when the command CMD is inputted thereto. In addition, the integrated circuit includes a data retention unit 350 retains data while data D0 to D9 are aligned and loaded on the plurality of data lines A0 to A3, B0 and B1 in response to the plurality of pulse signals P0 to P4.

The plurality of data lines A0 to A3, B0 and B1 include a plurality of first type data lines A0 to A3 and one or more second type data lines B0 and B1. The plurality of pulse signals P0 to P4 include a plurality of first pulse signals P0 to P3 corresponding to the plurality of first type data lines A0 to A3, and one or more second pulse signals P4 corresponding to the one or more second type data lines B0 and B1.

FIG. 3 illustrates a case in which the number of the first type data lines A0 to A3 is four, the number of the transfer lines C0 to C3 is four, and the number of the second type data lines B0 and B1 is two. The numbers may change according to different environments in which the FIG. 3 circuit is implemented.

The operation of the integrated circuit will be described below with reference to FIG. 3.

An exemplary embodiment of the present invention may be applied to an integrated circuit in which the number of signals outputted in response to a single command is not $2^N$. For illustration purposes, a case in which an integrated circuit is a memory device and performs a data output operation will be exemplarily described, where a data burst length is 10 bits, which is not a number equal to $2^N$, where N is a natural number. Here, data D0 to D7 (hereinafter, referred to as first type data) transferred by the first type data lines A0 to A3 among ten bits of data correspond to data outputted from memory cells, and data D8 and D9 (hereinafter, referred to as second type data) transferred by the second type data lines B0 and B1 correspond to cyclic redundancy check (CRC) data representing error check results of the first type data D0 to D7. However, the present invention is not limited to the foregoing exemplary embodiment.

When a command CMD is inputted to an integrated circuit (hereinafter, a memory device), data begins to be outputted after the elapse of a latency. The command CMD is a command for data output. The latency is time from the point of time when the command CMD is inputted to the point of time when data D0 to D9 are outputted through the data output unit 330. The integrated circuit may be a memory device. In this case, the command CMD is a signal corresponding to a read command, and the latency is a CAS latency (CL).

The command CMD is inputted at every time that data is to be outputted in response to the command CMD. The command CMD is successively inputted so as to output a plurality of data successively, where such an operation may constitute a general operation of the memory device. When the burst length is 10, the command CMD is inputted at every five clocks, and, when the burst length is 8, the command CMD is inputted at every four clocks. This is because CAS to CAS delay (tCCD) is changed according to the burst length. tCCD is a minimum time for a next column access after a column access of a certain bank.

An operation mode in which the number of data outputted in response to the command CMD is $2^N$ is referred to as a first operation mode, and an operation mode in which the number of data outputted in response to the command CMD is not $2^N$ is referred to as a second operation mode. Thus, the memory device operates in the first operation mode when the burst length is 8, and operates in the second operation mode when the burst length is 10.

(1) Case in which the memory device operates in the second operation mode (for example, burst length=10)

In a case in which the memory device operates in the second operation mode, if the first output data D0 (hereinafter, "start data") corresponding to the Kth command CMD (where K is a natural number) is outputted at the point of time when CK0 is activated, the start data D0 corresponding to the (K+1)th command CMD is to be outputted at the point of time when CK2 is activated. In the second operation mode, the point of time when the start data D0 is outputted is continuously changed. For example, if the first start data D0 is outputted at the point of time when CK0 is activated, next start data D0 is outputted at the point of time when CK2 is activated. Then, next start data D0 is outputted at the point of time when CK0 is activated.

When the burst length is 10, the command CMD is inputted at every five clocks. When the command CMD is inputted, the data D0 to D7 (hereinafter, output data) outputted from the memory cells are aligned and loaded on the first type data lines A0 to A3. The CRC data D8 and D9 are aligned and loaded on the second type data lines B0 and B1. Here, the first type data D0 to D7 become the output data, and the second type data D8 and D9 become the CRC data. The second type data D8 and D9 may also be non-CRC data and may represent data that are added other than the $2^N$ data loaded on the first type data lines A0 to A3. The second type data D8 and D9 may be loaded on the second type data lines B0 and B1.

The data loading operation is performed as follows. The data retention unit 350 retains data inputted when the command CMD is inputted, where the data retention time is five clocks which in turn are equal to a command input interval. The pulse signal generation unit 340 generates the plurality of pulse signals P0 to P4 when the command CMD is inputted. In particular, when the burst length is 10, the plurality of first pulse signals P0 to P3 are activated and then the one or more second pulse signals P4 are activated. The pulse signal P0 is activated when the command CMD is inputted, and has a pulse width of 2 clocks. The pulse signals P1 to P4 are generated by delaying P0 by 1 to 4 clocks (CLK), respectively. The pulse signal generation unit 340 sequentially activates the plurality of pulse signals P0 to P4. At this time, when the command CMD is inputted again, the pulse signal generation unit 340 is reset and repeats the sequential generation of the plurality of pulse signals.

The data D0 to D9 retained by the data retention unit 350 are loaded on the data lines A0 to A3, B0 and B1 through AND gates X1 to X10 together with the pulse signals corresponding to the data D0 to D9 among the plurality of pulse signals P0 to P4. The pulse signals P0 to P4 are sequentially activated at constant intervals. For example, D0 is combined with P0 at X1 and is transferred to data line A0 through OR gate Y1. Therefore, D0 is loaded on data line A1 during the activation period of P0. At this time, the activation time points of the pulse signals P0 to P4 are different. Due to such a difference, the data D0 to D9 are aligned and loaded on the plurality of data lines A0 to A3, B0 and B1.

After the first type data D0 to D7 (the output data) are loaded on the plurality of first type data lines A0 to A3 by the plurality of first pulse signals P0 to P3, the second type data D8 and D9 (the CRC data) are loaded on the one or more second type data lines B0 and B1 in response to the one or more pulse signals P4.

The data transfer unit 320 transfers the data loaded on the plurality of data lines A0 to A3, B0 and B1 to the plurality of transfer lines C0 to C3 in response to the correlation signal MAT.

The data output unit 330 outputs the data of the transfer line corresponding to the transmission signal activated among the transmission signals CK0 to CK3 to the output line S. In FIG. 3, transfer lines C0, C1, C2, and C3 correspond to transmission signals CK0, CK1, CK2, and CK3, respectively. For illustration purposes, the plurality of transmission signals CK0 to CK3 are generated by using the clock CLK, and are repetitively activated in the order of CK0, CK1, CK2, and CK3. The number of the transmission signals may be changed according to the number of the transfer lines. Hereinafter, the clock CLK refers to a data output clock, which is also referred to as DQS.

By changing the correlation between the plurality of data lines A0 to A3, B0 and B1 and the plurality of transfer lines C0 to C3, the data output operation is performed even when the burst length is 10. Even when the start data D0 is always loaded on A0, intended operations may be performed by alternately changing the transfer line for data of A0 to C0 or C2. This is because the data of transfer line C0 is outputted at the point of time when transmission signal CK0 is activated, and the data of C2 is outputted at the point of time when CK2 is activated.

To this end, when the correlation signal MAT is activated, the data transfer unit 320 transfers the data loaded on the first one A0 of the plurality of first type data lines A0 to A3 to the transfer line C0 corresponding to the first activated transmission signal CK0 among the plurality of transfer lines C0 to C3. When the correlation signal MAT is deactivated, the data transfer unit 320 transfers the data loaded on the first type data line A2, which is not the first one A0 of the plurality of first type data lines A0 to A3, to the transfer line C0 corresponding to CK0 among the plurality of transfer lines C0 to C3.

In order to output the data of the other data lines in appropriate order, they are transferred to the transfer lines in response to the correlation signal MAT. In particular, after the data of the first type data lines A0 to A3 are transferred to the plurality of transfer lines C0 to C3, the data of the second type data lines B0 and B1 are transferred to the one or more transfer lines selected by the correlation signal MAT.

In FIG. 3, when the correlation signal MAT is activated, the data of B0 and B1 are transferred to C0 and C2, respectively. When the correlation signal MAT is deactivated, the data of B0 and B1 are transferred to C1 and C3, respectively.

That is, in FIG. 3, when the correlation signal MAT is activated, the data of A0, A1, A2 and A3 are transferred to C0, C1, C2 and C3, respectively, and then, the data of B0 and B1 are transferred to C0 and C1, respectively. When the correlation signal MAT is deactivated, the data of A0, A1, A2 and A3 are transferred to C2, C3, C0 and C1, respectively, and then, the data of B0 and B1 are transferred to C2 and C3, respectively.

For reference, the configuration and operation of the data transfer unit 320 will be described below. A plurality of first AND gates X1 to X10 and a plurality of first OR gates Y1 to Y4 load the plurality of data D0 to D9 on the plurality of first and second data lines A0 to A3, B0 and B1 when the plurality of pulses P0 to P4 are activated. A plurality of multiplexers L1 to L4 select one of the first data lines inputted thereto in response to the correlation signal MAT. The plurality of second AND gates K1 to K4 select two of the transfer lines C0 to C3 for receiving signals on the plurality of second data lines B0 and B1 in response to the correlation signal MAT. The plurality of OR gates M1 to M4 transfer the data of the first and second data lines A0 to A3, B0 and B1 to the plurality of transfer lines C0 to C3. The above-described configuration of the data transfer line 320 is only exemplary and any other reasonably suitable configuration thereof may also be used for performing the above-described operations.

When command CMD is input, the correlation signal generation unit 310 generates the correlation signal MAT by using a latency value CL and a logic value of one of the plurality of transmission signals CK0 to CK3 although the first activated transmission signal CK0 is shown as an input in FIG. 3. More specifically, when a value of the transmission signal CK0 and the latency value CL associated with the input of the command CMD is expressed in binary notation, the correlation signal MAT becomes the result obtained by logically combining the lowest bit CL of the latency with the value of the transmission signal CK0 (when the latency value CL is an odd multiple of the clock, the end digit of the latency value CL is '1' and, when the latency value CL is an even multiple of the clock, the end digit of the latency value is '0'.).

The activation interval of transmission signal CK0 is 2 clocks (which is an even multiple of the clock), and, after the transmission signal CK0 is activated, it takes 1 clock (which is an odd multiple of the clock CLK) until transmission signal CK2 is activated. Therefore, transmission signal CK0 is activated (that is, logic value is 1), when the command CMD is inputted, and the correlation signal MAT is activated when the latency value CL is an even multiple of the clock (that is, the value of the last digit of the latency value CL is 0). The command CMD is activated at every five clocks. Thus, when the next command CMD is activated, transmission signal CK0 is in a deactivated state (that is, the logic value of the last digit of transmission signal CK0 is 0), and the correlation signal MAT is deactivated because the value of the last digit of the latency value CL is 0.

If the correlation signal MAT is generated using the CK0 value and the latency value CL upon input of the command CMD, as described above, the state of the correlation signal MAT can be changed whenever the command CMD is inputted, in a case in which the burst length is 10. Therefore, the output time point of the start data D0 can be changed to correspond to the activation time point of CK0 or CK2.

The above-described operation is equally applicable to a case in which the latency value is an odd multiple of the clock (CL value is 1). According to another example, transmission signal CK2 may be used as the transmission signal for generating the correlation signal MAT, although D flip-flip 311 is shown to receive a logic value of CK0 and is configured to store the value when the command CMD is inputted. Exclusive OR gate 312 performs an exclusive OR operation on an output of the D flip-flop 311 and the last bit value CL of the latency (CL) to produce the correlation signal MAT.

Some transfer lines (for example, C1 and C3 in FIG. 3) among the plurality of transfer lines C0 to C3 have a certain delay value (for example, 0.5 clock). When the data output unit 330 aligns received data with the transmission signal (one of CK0 to CK3) corresponding thereto, all data thus outputted are made to have a front margin of 1 clock and a rear margin of 0.5 clock (CLK). However, such a delay is optional.

(2) Case in which the memory device operates in the first operation mode (that is, burst length=8)

In a case in which the memory device operates in the first operation mode, the start data D0 may always be outputted at the activation time point of CK0 (or CK2). When the burst length is 8, the command CMD is inputted at every four clocks. Therefore, even though the command CMD is successively inputted, the CK0 value when the command CMD is inputted is constantly '1' or constantly '0' because the activation interval of transmission signal CK0 is 2 clocks (CLK). Therefore, the state of the correlation signal MAT is constantly output as an activated state or constantly output as a deactivated state.

In the first operation mode, when the start data D0 is outputted at the activation time point of CK0, the start data D0 is always outputted at the activation time point of CK0. When the start data D0 is outputted at the activation time point of CK2, the start data D0 is always outputted at the activation time point of CK2.

The correlation between the plurality of first type data lines D0 to D3 and the plurality of transfer lines C0 to C3 in response to the activation of the correlation signal MAT is identical to the case of the second operation mode. In the first operation mode, however, no data are transferred to the transfer lines C0 to C3 because no data are loaded on B0 and B1.

When the command CMD is inputted, only the data D0 to D7 (hereinafter, output data) outputted from the memory cells of the memory device are aligned and loaded on the first type data lines A0 to A3. In the above-described example, the first operation mode may correspond to an operation mode which does not generate the CRC data D8 and D9.

Since the CRC data D8 and D9 (that is, the second type data) are not generated, the one or more second pulse signals P4 for loading the CRC data on the one or more second type data lines B0 and B1 are not required. Therefore, the pulse signal generation unit 340 sequentially activates the plurality of first pulse signals P0 to P3, and does not activate the one or more second pulse signals P4. When the command CMD is inputted, P0 to P3 are sequentially activated. As opposed to the second operation mode, since the command CMD is activated at every four clocks (CLK), P0 to P3 are sequentially activated after the command CMD is inputted, and the command CMD is again inputted before and without any activation of P4. Then, the pulse signal generation unit 340 again activates P0 to P3 sequentially.

The operation of the data output unit 330 is substantially identical to the second operation mode.

Even when the number of the signals outputted in response to the single command CMD is not $2^N$, the signals can be outputted as $2^N$ transmission signals CK0 to CK4 generated by using the clock CLK appropriately. According to an exemplary embodiment, a simple configuration may be used to accommodate the case in which the number of the signals outputted in response to the single command CMD is $2^N$ as well as the case in which the number of the signals outputted in response to the single command CMD is not $2^N$. In either cases, when the operation of successively outputting the signals or data is performed, the interval at which the command CMD accompanied by the output of the signals or data is inputted is associated with the number of the signals outputted in response to the single command CMD. Here, the command input interval in the example of FIG. 3 is determined by the burst length.

An exemplary embodiment of the present invention provides an integrated circuit which adjusts the activation time point of the transmission signal CK0 or CK2 at which the start data D0 is outputted. Such an adjustment is performed by a control signal (corresponding to the correlation signal MAT) generated using the latency value CL and the logic value of the transmission signal CK0 when the command CMD is inputted.

In FIG. 3, the pulse signal generation unit 340 is configured to generate the pulse for aligning the data D0 to D9 of the data retention unit 350. Thus, when considering only the output of the aligned data, the integrated circuit in accordance with an exemplary embodiment of the present invention may include the plurality of transfer lines C0 to C3, the data transfer unit 320, the data output unit 330, the correlation signal generation unit 310, and the pulse signal generation unit 340. The data transfer unit 320 transfers the data loaded on the plurality of data lines A0 to A4, B0 and B1 to the plurality of transfer lines C0 to C3 according to the correspondence relation defined by the correlation signal MAT. The data output unit 330 outputs the data of the transfer line corresponding to the transmission signal activated among the transmission signals CK0 to CK3. The correlation signal generation unit 310 generates the correlation signal MAT by using a logic value of the transfer line CK0 among the plurality of transfer lines C0 to C3 and a latency value when a command CMD is inputted thereto. The pulse signal generation unit 340 sequentially activates a plurality of pulse signals P0 to P4 when the command CMD is inputted thereto.

In addition, the integrated circuit in accordance with the exemplary embodiment of the present invention may include the plurality of transfer lines C0 to C3, the data transfer unit 320, the data output unit 330, the correlation signal generation unit 310, and the pulse signal generation unit 340. The data transfer unit 320 transfers the data loaded on the plurality of data lines A0 to A4 to the plurality of transfer lines C0 to C3 according to the correspondence relation defined by the correlation signal MAT. The data output unit 330 outputs the data of the transfer line corresponding to the transmission signal activated among the transmission signals CK0 to CK3. The correlation signal generation unit 310 generates the correlation signal MAT by using a logic value of the transfer line CK0 among the plurality of transfer lines C0 to C3 and a latency value when a command CMD is inputted thereto. The pulse signal generation unit 340 sequentially activates a plurality of pulse signals P0 to P3 when the command CMD is inputted thereto.

Figure 4:
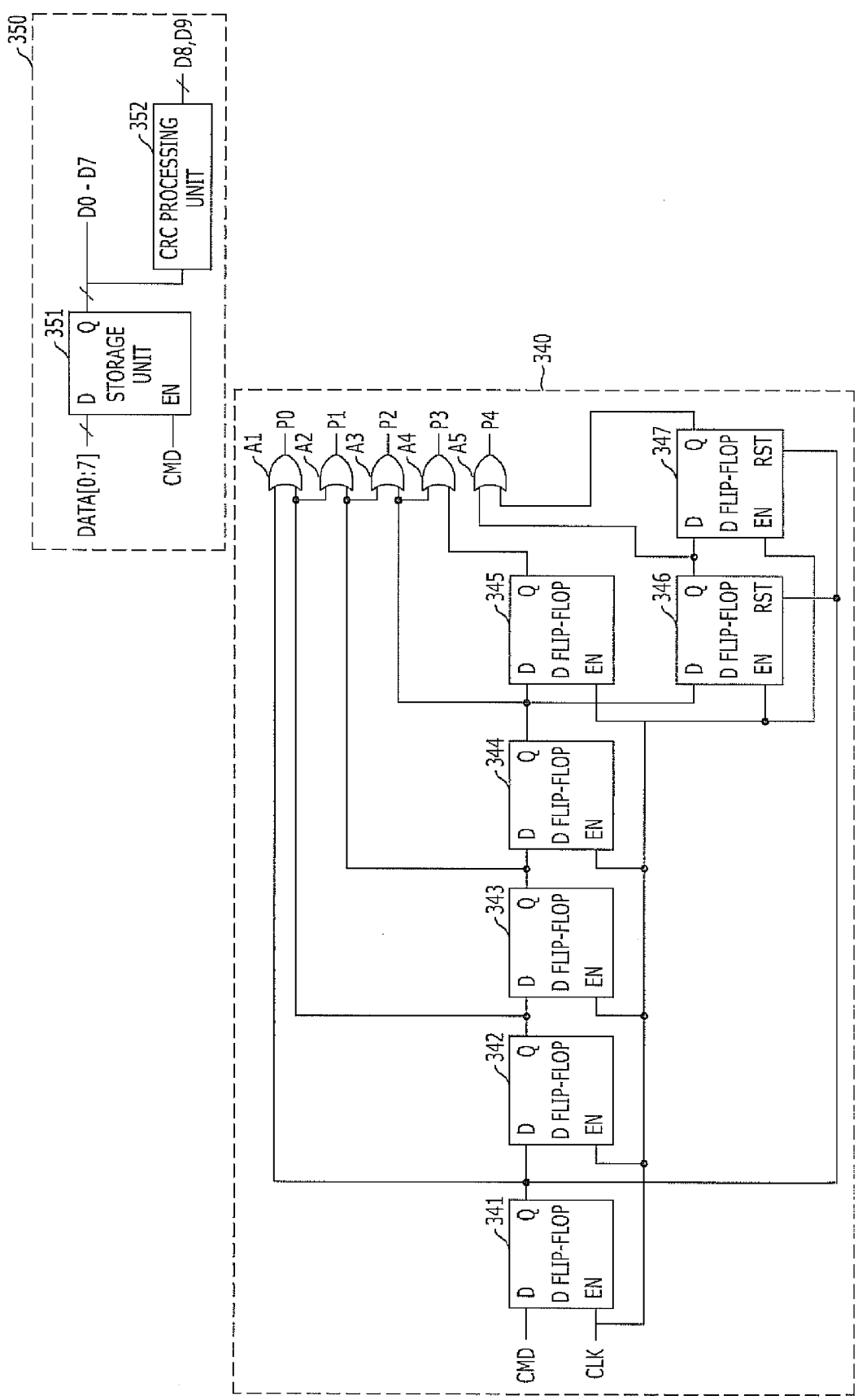
FIG. 4 is a configuration diagram of a pulse signal generation unit 340 and a data retention unit 350.

FIG. 4 is a configuration diagram of the pulse signal generation unit 340 and the data retention unit 350.

In a case in which the integrated circuit is a memory device, the configuration and operation of the pulse signal generation unit 340 and the data retention unit 350 will be described with reference to FIG. 4.

The pulse signal generation unit 340 includes a plurality of D flip-flops 341 to 347 and a plurality of OR gates A1 to A5. The inputted command CMD is synchronized with the clock CLK by the D flip-flop 341 and is delayed by 1 clock (CLK) by the D flip-flops 342 to 345 (the output of the D flip-flop 346 has the same output and phase as the D flip-flop 345) and the D flip-flop 347. Since the command CMD is a pulse signal whose activation period is 1 clock, the outputs of the D flip-flops 342 to 345 (the output of the D flip-flop 346 has the same output and phase as the D flip-flop 345) and the output of the D flip-flop 347 are pulse signals whose phase difference is 1 clock, respectively, and whose activation period is 1 clock. The plurality of pulse signals P0 to P4 may be generated by combining the outputs of the adjacent D flip-flops among the outputs of the D flip-flops 342 to 345 (the output of the D flip-flop 346 has the same output and phase as the D flip-flop 345) and the output of the D flip-flop 347 by using the OR gates A1 to A5. For reference, the reason for synchronizing the command CMD with the clock CLK is that the command CMD is synchronized with the system clock (not shown), not the clock CLK. In a case in which the command CMD is synchronized with the clock CLK, the pulse signal generation unit 340 may not include the D flip-flop 341.

The D flip-flops 341 to 345 are configured to generate the plurality of first pulse signals P0 to P3, and the D flip-flops 346 and 347 are configured to generate the one or more second pulse signals P4. The D flip-flops 341 to 345 sequentially activate the plurality of first pulse signals P0 to P3 regardless of the operation mode of the integrated circuit.

The D flip-flop 346 is reset when the command CMD is inputted. At this time, the D flip-flops 346 and 347 delay outputting their respective output signals by receiving delayed output signal from the D flip-flop 344. Since the D flip-flop 347 delays the output of the D flip-flop 346, the D flip-flop 347 does not generate the delayed pulse signal when the D flip-flop 346 is reset.

In a case in which the integrated circuit operates in the second operation mode, since the command CMD is inputted at every five clocks, the D flip-flops 346 and 347 activate the second pulse signal P4 after the first pulse signals P0 to P3 are activated.

In a case in which the integrated circuit operates in the first operation mode, since the command CMD is inputted at every four clocks, the command CMD is again inputted after the first pulse signals P0 to P3 are activated. Therefore, before the D flip-flop 346 outputs the signal generated by delaying the output of the D flip-flop 344, the command CMD synchronized with the clock CLK is inputted to the reset terminal of the D flip-flop 346 and thus the D flip-flop 346 is reset. Therefore, since the D flip-flops 346 and 347 further delay outputting an output signal of the D flip-flop 344 by 1 clock and 2 clocks, the second pulse signal P4 is not activated.

For illustration purposes, the reset terminals of the D flip-flops 341 to 345 and 347 are not illustrated since the D flip-flops 341 to 345 and 347 are not reset and thus the reset terminals RST thereof are disabled during the operation of the integrated circuit (that is, the D flip-flops 341 to 345 and 347 are not reset during the operation of the integrated circuit).

The data retention unit 350 includes a storage unit 351 and a CRC processing unit 352.

When the command CMD is inputted, the storage unit 351 stores the data DATA<0:7> outputted from the memory cells. The storage unit 351 retains the stored data until a next command CMD is inputted, and updates the stored data when the next command CMD is inputted. The CRC processing unit 352 generates CRC data D8 and D9 by checking the error of the data DATA<0:7>. According to an example, the CRC data D8 and D9 are delayed by the error checking operation, and the phases of the CRC data D8 and D9 lag behind those of the data DATA<0:7> by 2-3 clocks (CLK). As described above with reference to FIG. 3, the data retention unit 350 retains the data D0 to D9 until the data D0 to D9 are aligned and loaded on the data lines A0 to A3, B0 and B1 by the plurality of pulse signals P0 to P4.

Figure 5A:
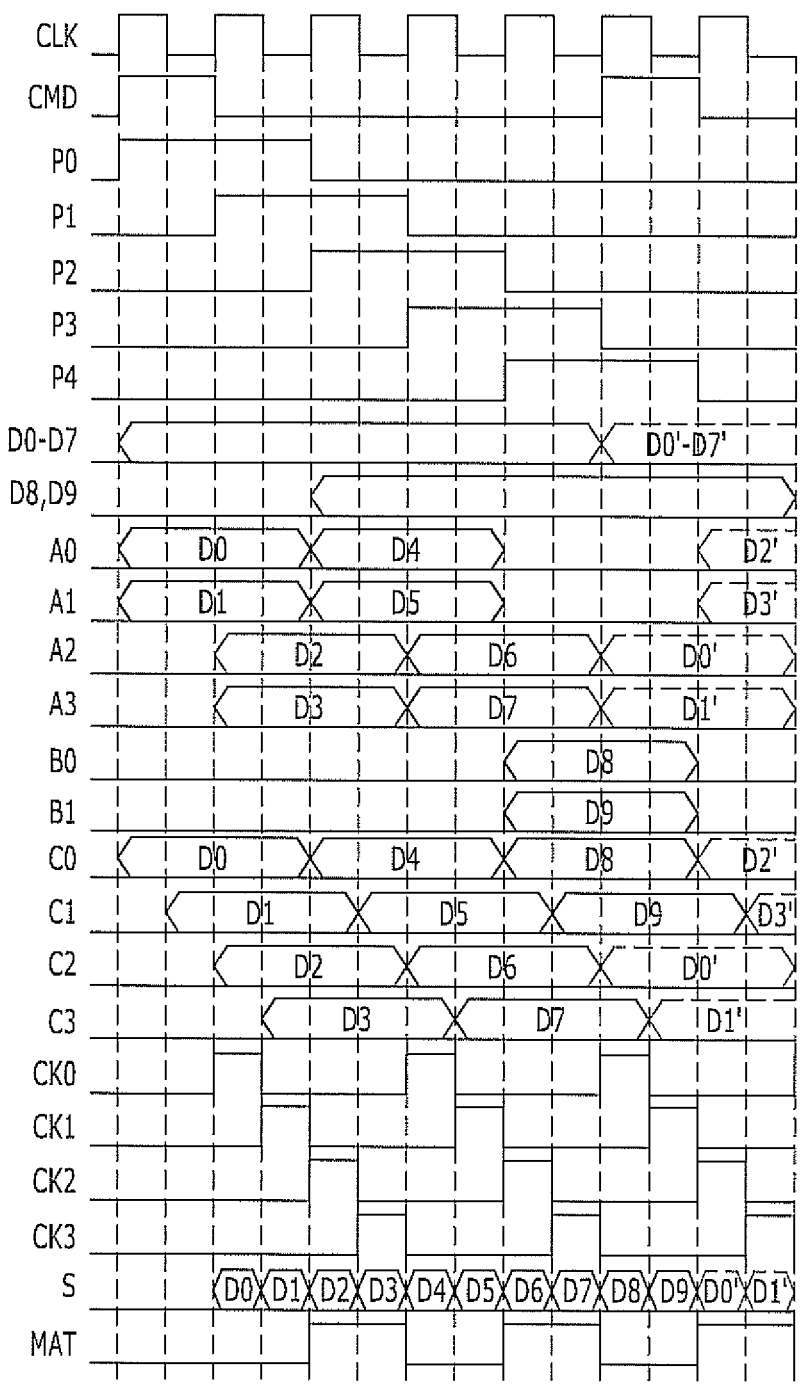
FIGS. 5A and 5B are waveform diagrams illustrating the operation of the integrated circuit when burst length is 10 (second operation mode).
Figure 5B:
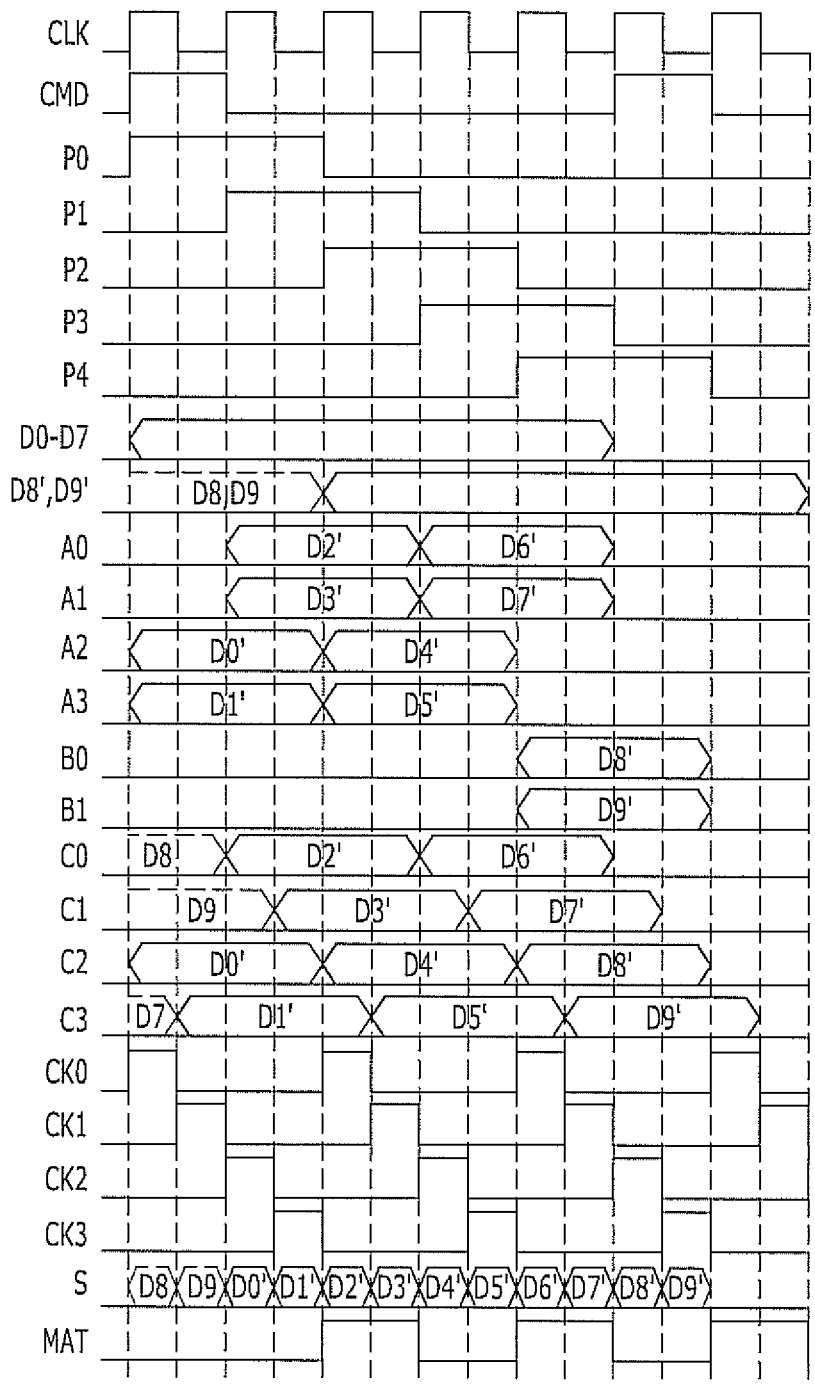

FIGS. 5A and 5B are waveform diagrams illustrating the operation of the integrated circuit when the burst length is 10 (that is, second operation mode).

FIG. 5A illustrates an operation in which the start data D0 corresponding to the first inputted command CMD is outputted at the activation time point of transmission signal CK0.

In the second operation mode, the command CMD is inputted at every five clocks. The first type data D0 to D7 (that is, the output data) are retained from the point of time when the command CMD is inputted to the point of time when the next command CMD is inputted. The second type data D8 and D9 (that is, the CRC data) has the same retention period as the first type data D0 to D7, but the retention period of the second type data D8 and D9 lags the retention period of the first type data D0 to D7 by 2 clocks, due to the delay caused by the CRC operation.

In the second operation mode, when the command CMD is inputted, the pulse signals P0 to P4 are sequentially activated. As described above with reference to FIG. 4, the plurality of pulse signals P0 to P4 are generated by combining signals that are generated by delaying the command CMD by constant intervals. At this time, D0 to D7 are loaded on the plurality of first type data lines A0 to A3 during the activation period of the plurality of first pulse signals P0 to P3, and D8 and D9 are loaded on the one or more second type data lines B0 and B1 during the activation period of the one or more second pulse signals P4. Although data D0 to D7, D8 and D9 are illustrated as groups on the timing graphs for D0-D7 and D8,D9, they are loaded on different data lines A0 to A3 and B0 and B1 even if they have the same action period for each group.

Here, since the correlation signal MAT is in an activated state, data of data lines A0, A1, A2 and A3 are transferred to C0, C1, C2 and C3, respectively. In addition, after the data of the plurality of first type data lines A0 to A3 are loaded on the plurality of transfer lines C0 to C3, the data D8 and D9 of the plurality of second type data lines B0 and B1 are loaded on the transfer lines C0 and C1 selected by the correlation signal MAT.

Meanwhile, the data loaded on the second and fourth transfer lines C1 and C3 are delayed by 0.5 clock (CLK). FIG. 5A illustrates the waveform where the delay values of the transfer lines C1 and C3 are reflected. The data of the plurality of transfer lines C0 to C3 are serially aligned in the data output unit 330 and outputted to the output line S.

Portions indicated by dotted lines illustrate the operation connected to FIG. 5B which will be described below.

FIG. 5B illustrates an operation in which the start data D0 (that is, D0') corresponding to the command CMD inputted after the input of the previous command CMD of FIG. 5A is outputted at the activation time point of CK2.

The operation of loading D0' to D7' on the plurality of first type data lines A0 to A3, the operation of loading D8' and D9' on one or more second type data lines B0 and B1, and the operation of generating the plurality of pulse signals P0 to P4 are substantially identical to those of FIG. 5A.

Since the correlation signal MAT is in a deactivated state, data of A0, A1, A2 and A3 are transferred to C2, C3, C0 and C1, respectively. In addition, after the data of the plurality of first type data lines A0 to A3 are loaded on the plurality of transfer lines C0 to C3, the data D8' and D9' of the plurality of second type data lines B0 and B1 are loaded on the transfer lines C2 and C3 selected by the correlation signal MAT.

The data loaded on the second and fourth transfer lines C1 and C3 are delayed by 0.5 clock (CLK). FIG. 5B illustrates the waveform when the delay values of the transfer lines C0 to C3 are reflected. The data of the plurality of transfer lines C0 to C3 are serially aligned in the data output unit 330 and outputted to the output line S.

Portions indicated by dotted lines illustrate the operation connected to FIG. 5A.

The above-described operations of FIGS. 5A and 5B are repeated in turn afterwards. Through these operations, ten bits of data are outputted as one group whenever the command is inputted.

Figure 6:
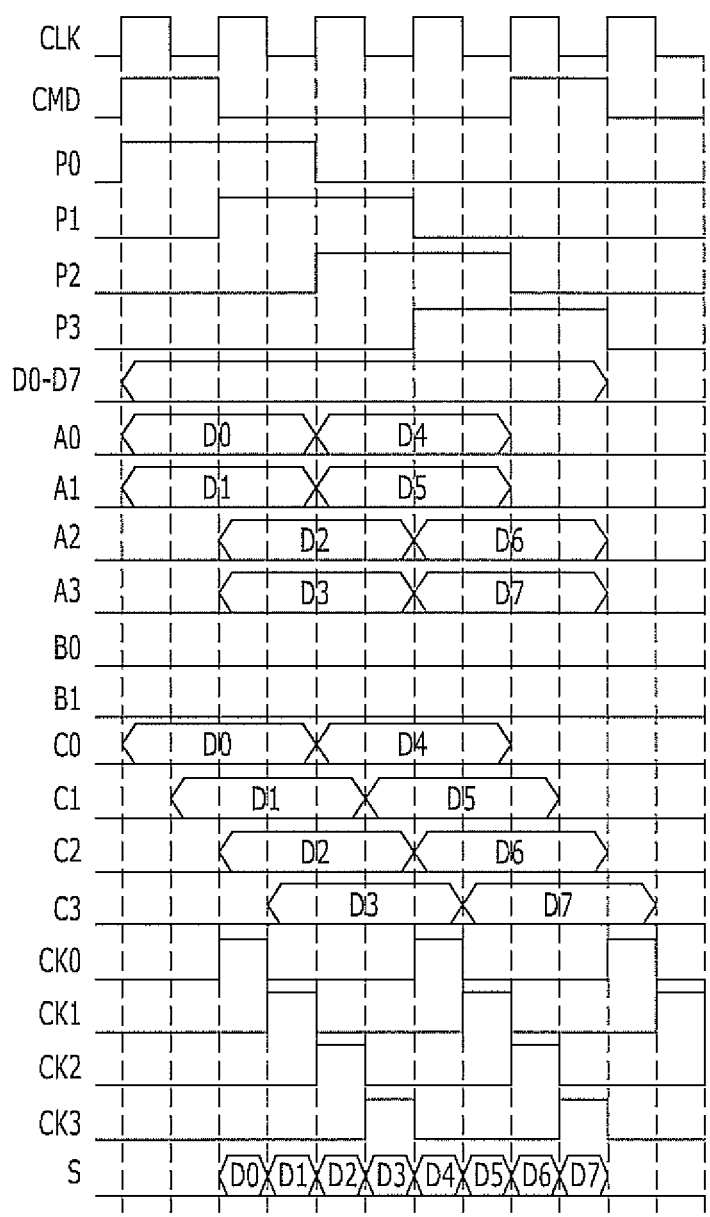
FIG. 6 is a waveform diagram illustrating the operation of the integrated circuit when burst length is 8 (first operation mode).

FIG. 6 is a waveform diagram illustrating the operation of the integrated circuit when the burst length is 8 (that is, first operation mode).

In the first operation mode, the command CMD is inputted at every four clocks. The first type data (the output data) D0 to D7 are retained from the point of time when the command CMD is inputted to the point of time when the next command CMD is inputted. In the first operation mode, the second type data (the CRC data) D8 and D9 are not generated.

In the first operation mode, when the command CMD is inputted, P0 to P3 are sequentially activated. As described above with reference to FIG. 5, the plurality of first pulse signals P0 to P3 are obtained by combining signals generated from delaying the command CMD by constant intervals. At this time, instead of inputting the command CMD before the one or more second pulse signals P4 are activated, the one or more second pulse signals P4 are not activated, and the plurality of first pulse signals P0 to P3 are sequentially activated. At this time, D0 to D7 are loaded on the plurality of first type data lines A0 to A3 in the activation period of the plurality of first pulse signals P0 to P3. Although D0 to D7 are illustrated as forming one group, they are loaded on different lines despite having the same activation period.

In FIG. 6, when the correlation signal MAT is in an activated state, the data of A0, A1, A2, and A3 are transferred to C0, C1, C2, and C3, respectively. Such a correlation may be continuously maintained. If the correlation signal MAT is in a deactivated state, the data of A0, A1, A2, and A3 are transferred to C2, C3, C0, and C1, respectively. Such a correlation may be continuously maintained.

The data loaded on transfer lines C2 and C3 which are not initially selected by the correlation signal MAT are delayed from being selected by 0.5 clock (CLK) compared to the section of the data loaded on transfer lines C0 and C1. FIG. 6 illustrates the waveform when the delay values of the transfer lines C0 to C3 are reflected. The data of the plurality of transfer lines C0 to C3 are serially aligned in the data output unit 330 and outputted to the output line S.

The above-described operations of FIGS. 5A and 5B are repeated afterwards. Through these operations, eight bits of data are outputted as one group whenever the command is inputted. When the burst length is 8, the start data D0 is outputted when transfer signal CK0 (or CK2) is activated.

Figure 7:
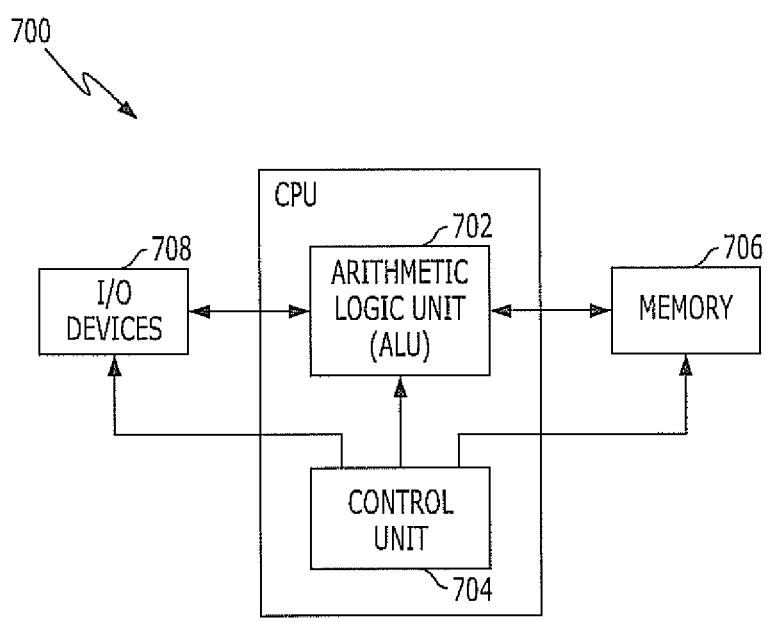
FIG. 7 is a simplified block diagram of an exemplary electronic system including an integrated circuit of the present invention.

FIG. 7 is a simplified block diagram of an exemplary electronic system including an integrated circuit of the present invention.

Referring to FIG. 7, an electronic system 700 may correspond to a computer system, a process control system, or any other system that employs a processor and associated memory including an integrated circuit of the present invention.

The electronic system 700 may include a processor or arithmetic/logic unit (ALU) 702, a control unit 704, a memory device unit 706 and an input/output (I/O) devices 708.

The electronic system 700 will have a native set of instructions that specify operations to be performed on data by the processor 702 and other interactions between the processor 702, the memory device unit 706 and the I/O devices 708.

The control unit 704 controls all operations of the processor 702, the memory device unit 706 and the I/O devices 708 by continuously cycling through a set of operations that cause instructions to be fetched from the memory device 706 and executed. In various embodiments, the memory device unit 706 includes a random access memory (RAM) devices, read-only memory (ROM) devices and peripheral devices such as a floppy disk drive and a compact disk CD-ROM drive.

In accordance with the exemplary embodiments of the present invention, using a designated latency value and a logic value of the transmission signal, the transmission signal in response to which the first data is outputted is determined.

According to an exemplary embodiment, the control for parallel-to-serial conversion of the plurality of data is properly performed in the case in which the number of the plurality of data outputted in response to the single command is $2^N$ and the case in which the number of the plurality of data outputted in response to the single command is not $2^N$ while using relatively simple configuration and control.

While the present invention has been described with respect to the specific embodiments, it will be apparent to those skilled in the art that various changes and modifications may be made without departing from the spirit and scope of the invention as defined in the following claims.

What is claimed is:

1. An integrated circuit comprising:
   a plurality of data lines on which data aligned by a plurality of pulse signals are loaded;
   a plurality of transfer lines;

a data transfer unit configured to transfer the data of the plurality of data lines to the plurality of transfer lines in response to a correlation signal;

a data output unit configured to output the data of the transfer line corresponding to a transmission signal activated among a plurality of transmission signals;

a correlation signal generation unit configured to generate the correlation signal using a latency value and a logic value of one of the plurality of transmission signals when a command is inputted to the correlation signal generation unit; and a pulse signal generation unit configured to sequentially activate the plurality of pulse signals when the command is inputted.

2. The integrated circuit of claim 1, wherein the plurality of data lines comprise a plurality of first type data lines and one or more second type data lines and the plurality of pulse signals comprise a plurality of first pulse signals corresponding to the plurality of first type data lines and one or more second pulse signals corresponding to the one or more second type data lines.

3. The integrated circuit of claim 2, wherein the integrated circuit has two operation modes, n is a natural number, an operation mode in which a number of data outputted by the integrated circuit in response to the command equals $2^N$ is a first one of the two operation modes and an operation mode in which the number of data outputted by the integrated circuit in response to the command is not equal to $2^N$ is a second one of the operation modes.

4. The integrated circuit of claim 3, wherein, in the first operation mode, the pulse signal generation unit is configured to sequentially activate the one or more first pulse signals and deactivate the one or more second pulse signals and, in the second operation mode, the pulse signal generation unit is configured to sequentially activate the one or more first pulse signals and sequentially activate the one or more second pulse signals.

5. The integrated circuit of claim 1, wherein, in response to corresponding pulse signals among the plurality of pulse signals, the data of the plurality of data lines are passed through an AND gate and loaded on the plurality of data lines.

6. The integrated circuit of claim 3, wherein, in the first operation mode, the aligned data are loaded on the plurality of first type data lines but not on the one or more second type data lines and, in the second operation mode, the aligned data are loaded on the plurality of first type data lines and the one or more second type data lines.

7. The integrated circuit of claim 1, wherein the command is a command for data output, and the command is inputted at every time that a corresponding number of the data is to be outputted in response to the command.

8. The integrated circuit of claim 1, wherein a part of the plurality of transfer lines are arranged to delay the data transferred thereto.

9. The integrated circuit of claim 1, wherein the latency value indicates time from a point of time when the command is inputted to the correlation signal generation unit to the point of time when the data output unit begins to output the data.

10. The integrated circuit of claim 3, wherein the correlation signal generation unit is configured to generate the correlation signal by using the latency value and the logic value of the first activated transmission signal among the plurality of transmission signals when the plurality of transmission signals are sequentially activated.

11. The integrated circuit of claim 10, wherein, when the correlation signal is activated, the data transfer unit is configured to transfer the data loaded on a first one of the plurality of first type data lines to the transfer line corresponding to the first activated transmission signal among the plurality of transfer lines and, when the correlation signal is deactivated, the data transfer unit is configured to transfer the data loaded on a different one of the first type data lines to the transfer line corresponding to the first activated transmission signal among the plurality of transfer lines.

12. The integrated circuit of claim 3, wherein, in the first operation mode, the data of the second type data lines are not transferred to the plurality of transfer lines and, in the second operation mode, the data of the second type data lines are transferred after the data of the first type data lines are transferred to the one or more transfer lines selected by the correlation signal among the plurality of transfer lines.

13. The integrated circuit of claim 2, wherein the data loaded on the one or more second type data lines are cyclic redundancy check (CRC) data which are error check results of the data loaded on the one or more first type data lines.

14. The integrated circuit of claim 1, wherein the data transfer unit includes at least one multiplexer coupled to two of the plurality of data lines for selecting one of the two data lines to output the data loaded on the selected data line and a logic gate coupled to receive an output of the at least one multiplexer and the data loaded on a third one of the plurality of data lines that is different from the two data lines.

15. The integrated circuit of claim 14, further comprising a second logic gate configured to receive the correlation signal and the data of the third data line, wherein the at least one multiplexer is configured to receive the correlation signal and the first logic gate is configured to receive an output of the second logic gate.

16. The integrated circuit of claim 1, wherein the data output unit is configured to receive the plurality of transmission signals and output the data of the transfer line corresponding to the activated transmission signal in response to the activated transmission signal.

17. An integrated circuit comprising:
a plurality of data lines;
a plurality of transfer lines;
a data transfer unit configured to transfer data of the plurality of data lines to the plurality of transfer lines in response to a correlation signal;
a data output unit configured to output data of the transfer line corresponding to a transmission signal activated among a plurality of transmission signals; and
a correlation signal generation unit configured to generate the correlation signal using a latency value and a logic value of one of the plurality of transmission signals when a command is inputted to the correlation signal generation unit.

18. The integrated circuit of claim 17, wherein, in response to corresponding pulse signals among the plurality of pulse signals, the data of the plurality of data lines are passed through an AND gate and loaded on the plurality of data lines.

19. The integrated circuit of claim 17, wherein the command is a command for data output, and the command is inputted at every time that a corresponding number of the data is to be outputted in response to the command.

20. The integrated circuit of claim 17, wherein a part of the plurality of transfer lines are arranged to delay the data transferred thereto.

21. The integrated circuit of claim 17, wherein the latency value indicates time from a point of time when the command is inputted to the correlation signal generation unit to the point of time when the data output unit begins to output the data.

22. The integrated circuit of claim 17, wherein the correlation signal generation unit is configured to generate the correlation signal by using the latency value and the logic value of the first activated transmission signal among the plurality of transmission signals when the plurality of transmission signals are sequentially activated.

23. The integrated circuit of claim 17, wherein, when the correlation signal is activated, the data transfer unit is configured to transfer the data loaded on a first one of the plurality of first type data lines to the transfer line corresponding to the first activated transmission signal among the plurality of transfer lines and, when the correlation signal is deactivated, the data transfer unit is configured to transfer the data loaded on a different one of the first type data lines to the transfer line corresponding to the first activated transmission signal among the plurality of transfer lines.

* * * * *